United States Patent
McRae

[15] 3,674,064
[45] July 4, 1972

[54] APPARATUS FOR CUTTING AND MARKING PLATE STOCK OF THE TYPE USED IN BUILDING WALL PANELS

[72] Inventor: James L. McRae, P.O. Box 4195, Meridian, Miss. 39301

[22] Filed: Sept. 4, 1970

[21] Appl. No.: 69,631

[52] U.S. Cl............................143/46 R, 143/168 R, 144/288 C
[51] Int. Cl..............................................................B27b 5/18
[58] Field of Search..............143/6.46, 46 A, 46 F, 6.47, 143/168 R, 288 C; 144/3 E, 3 F, 3 M, 286 R, 286 A, 287

[56] References Cited

UNITED STATES PATENTS

| | | |
|---|---|---|
| 3,079,963 | 3/1963 | Jensen..................................144/3 N |
| 1,375,159 | 4/1921 | Krocker..............................143/168 R |
| 3,263,716 | 8/1966 | Albers............................143/168 R X |
| 2,995,162 | 8/1961 | Mountain..............................144/3 E |
| 3,024,818 | 3/1962 | Scoville..........................143/46 A X |

Primary Examiner—Andrew R. Juhasz
Assistant Examiner—James F. Coan
Attorney—David H. Semmes

[57] ABSTRACT

Apparatus for cutting and marking plate stock, such as the two by four type, used in building wall panels, particularly a longitudinally extending table for supporting the two by fours and a marking template in side by side relationship, and including a movable stop abutting the template and two by four at one end of the table and a circular saw pivotable across the stock for cutting the stock at the other end of the table.

6 Claims, 8 Drawing Figures

PATENTED JUL 4 1972

INVENTOR
JAMES L. McRAE

BY David H. Semmes

ATTORNEY

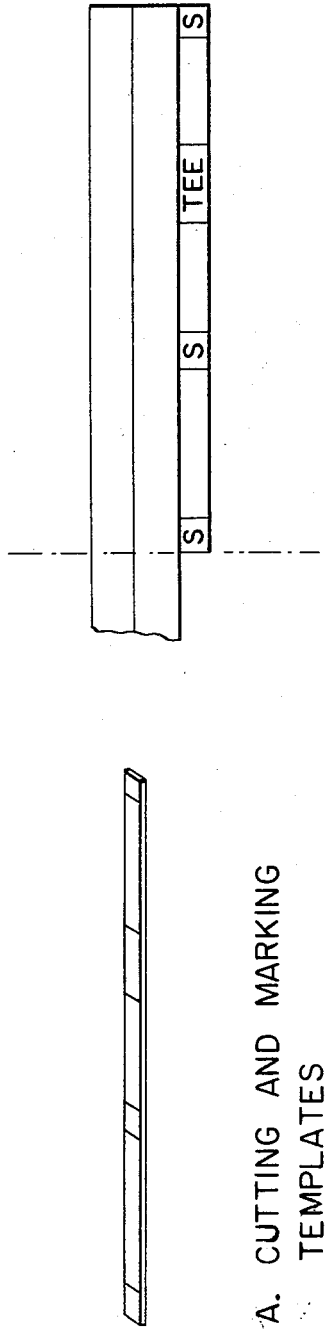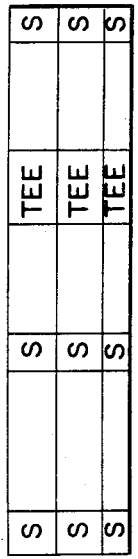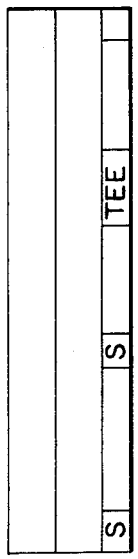
FIG. 2
A. CUTTING AND MARKING TEMPLATES
B. POSITIONING TEMPLATES ADJACENT PLATE STOCK
C. CUTTING PLATE STOCK
D. MARKING PLATE STOCK WITH STUD LOCATIONS
INVENTOR
JAMES L. McRAE
BY *David H. Semmes*
ATTORNEY

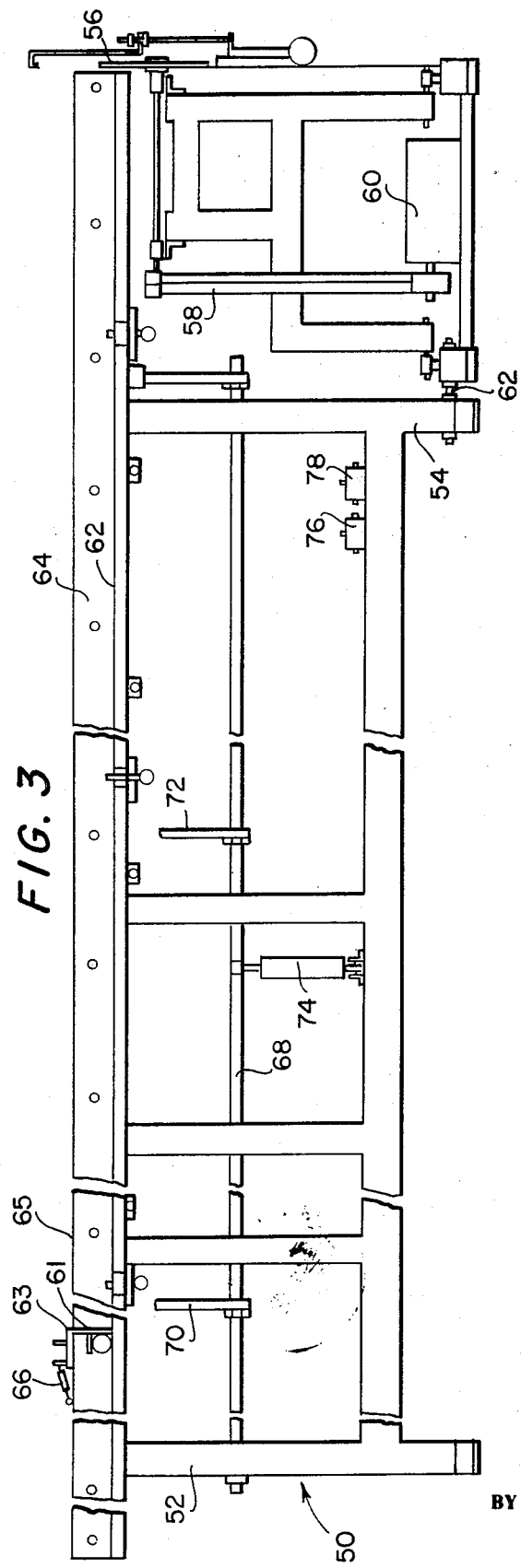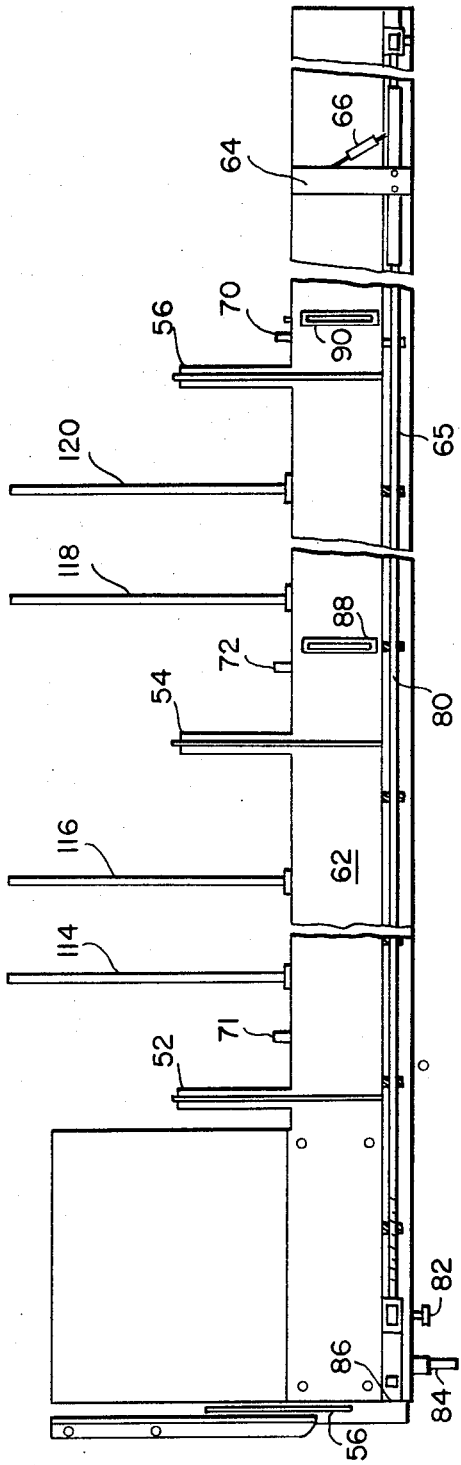

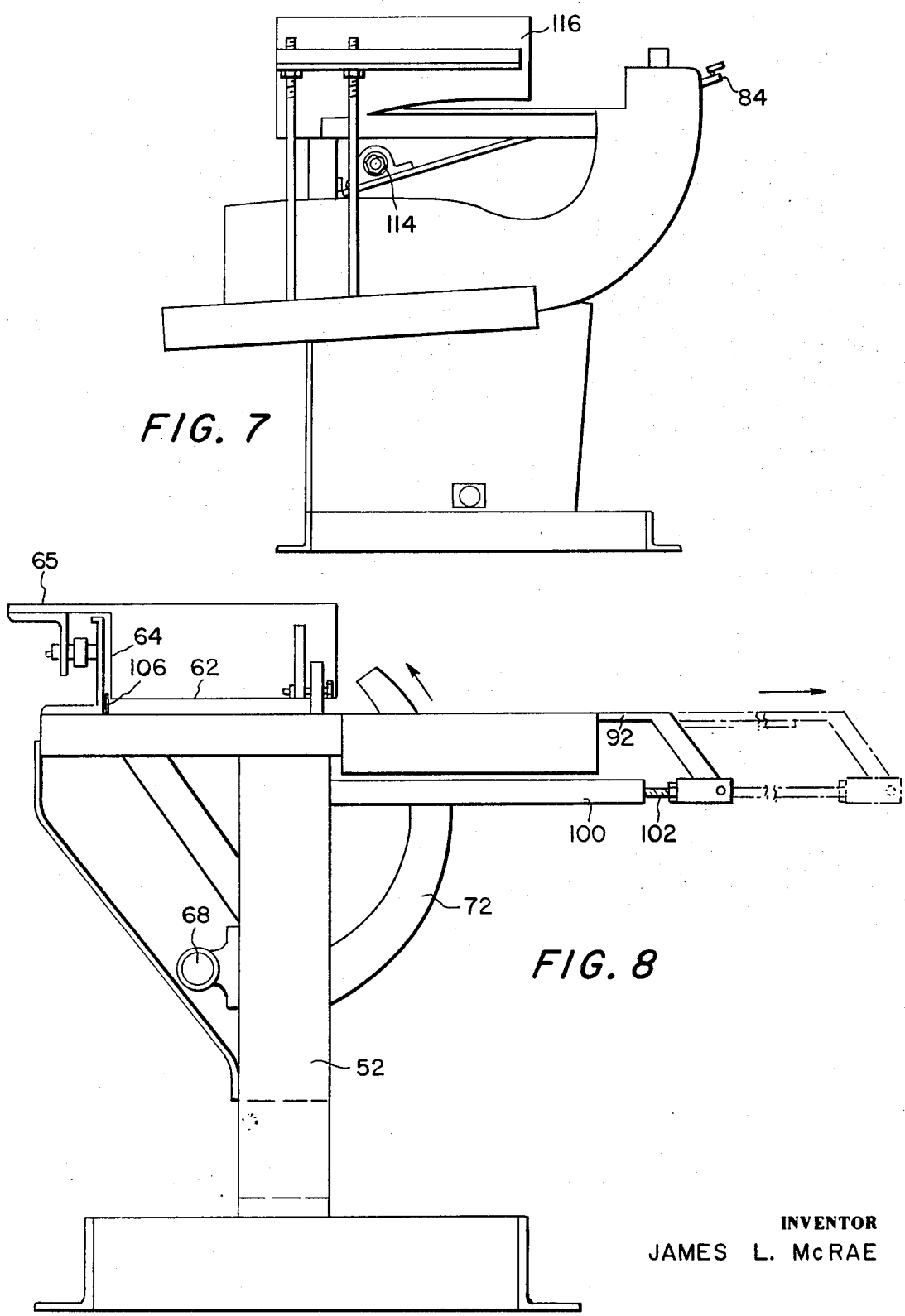

APPARATUS FOR CUTTING AND MARKING PLATE STOCK OF THE TYPE USED IN BUILDING WALL PANELS

CROSS-REFERENCES TO RELATED APPLICATIONS

A continuation-in-part of applicant's METHOD FOR BUILDING WALL PANELS (Ser. No. 49,735, filed June 25, 1970 and now U.S. Pat. No. 3,601,882). The parent application is directed to a method for custom manufacturing of building wall panels of the type including top and bottom plates intersected by a plurality of vertically extending studs. The present apparatus is directed to a device for cutting and marking the plate stock before assembly in the wall panel.

BACKGROUND OF THE INVENTION

1. Field of the Invention

Custom manufacture of house wall panels, as contrasted to prefabrication of standardized house wall panels. In conventional construction of wall panels, the op and bottom plates are measured one at a time by a tape measure or rule and individually cut on the job site. Even in industrial attempts to provide assembly line manufacture manual measuring and cutting is the standard technique. This standard technique is time-consuming, expensive and quite frequently inaccurate.

2. Description of the Prior Art:

Prior art reference include: U.S. Pat. Nos. 2,574,163 3,399,445.

U.S. Pat. No. 2,574,163 is fairly typical showing the positioning and fastening of frame members without specific detail as to how the individual members are cut prior to their being secured together. U.S. Pat. No. 3,399,445 is directed to the wall panel building wherein the pre-cut elements are stacked adjacent the wall panel assembly. There is no suggestion of techniques for cutting or marking of the individual plate or stud components.

SUMMARY OF THE INVENTION

According to the present invention, pre-cut and marked templates are used in an in-line method of cutting and marking the top and bottom plates prior to their injection into the wall panel assembly line. The need for measuring the plates with a tape measure or rule is eliminated, since a pre-cut layout template strip is supported together with the plate stock on a longitudinally extending table.

At the cutting end of the table there is provided a circular saw which is pivotable across the table so as to cut the stock. At the other end of the table there is provided a movable stop which abuts both the template end and the plate stock ends. As a result, when the saw cut is made, the plates are cut identically in length to the template. A pivotable clamp is provided for securing the lumber in the stop while the plate stock is being cut and, particularly, while the layout marks are being transferred from the template to the lumber. This eliminates any movement or sliding that the lumber might have, causing inaccurate layout. As the layout and cutting are finished, the lumber is ejected transversely from the support table onto a cross conveyor by use of a reciprocating ejector. This eliminates any effort on the part of the operator in removing his finished work and expedites the in-line process.

BRIEF DESCRIPTION OF THE DRAWINGS

FIG. 2 is a schematic presentation of the present method of cutting and marking plate stock;

FIG. 3 is a side elevation of a circular saw at the cutting end and a movable stop at the marking end;

FIG. 4 is a top plan;

FIG. 7 is an end elevation of the circular saw cutting end of the table; and

FIG. 8 is an end elevation of the cutting and marking end, showing the clamps being pivoted to engage plates supported on the bed.

DESCRIPTION OF THE PREFERRED EMBODIMENTS

Figure 1:
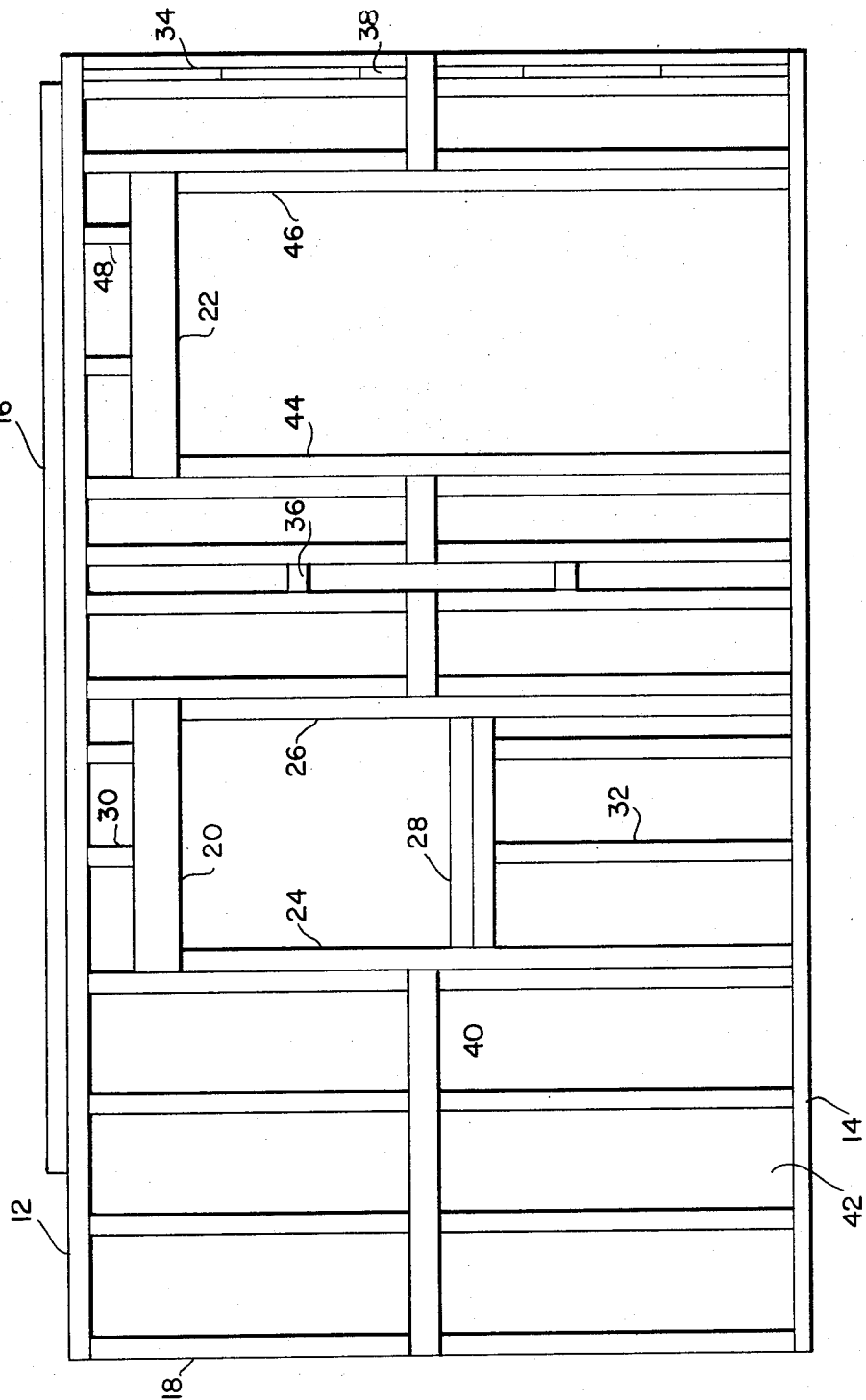
FIG. 1 is a front elevation of a conventional building wall panel of the type having top and bottom plates intersected by transversely extending stud members, tees, corners and packers supporting the conventional sill, header and cripper elements.

In FIG. 1 there is illustrated a top plate 12, having a cap plate 16, a bottom plate 14 with a plurality of vertically extending intersecting studs 18. These studs may be notched at their mid-section so as to receive complementally 1 × 4 let-in or inlet 40. The let-in stabilizes and aligns stud and packer elements during assembly and, if not cut-out at the door and window apertures, serves as a convenient means for handling the wall panel during shipment. Packers 24 and 26 are inserted adjacent sill 28 and header 20, sill 28 being stabilized by crippers 32 and header 20 being stabilized by crippers 30. Similar packers 44 and 46 may be positioned adjacent header 22 which may have a plurality of crippers 48. A tee 36 may be employed as a partition lead for an interior wall and a specially constructed corner 34 may be manufactured from the stud lengths and have a plurality of short pieces 38 therebetween so as to give the proper width. Manifestly, the packers, tees and corners may be variously manufactured so as to have the interior pieces 34 and 38 at right angles or parallel to the vertically extending stud member pieces, as illustrated.

According to the present method, templates are cut from light stock, such as 1⅛ inch by 2 inch, into the desired top and bottom plate lengths. The templates bear, also stud locations, as well as header, sill and cripper locations. The 2 inches × 4 inches plate stock is axially advanced into the plate cutting layout area. The templates are positioned adjacent the plate stock which is then cut by saw 56.

This technique is set forth schematically in FIG. 2. The previously cut and marked templates may be positioned in bins mounted above the plate cutting and marking area and readily accessible by the operator.

In FIG. 3 the plate cutting and marking, longitudinally extending table 50 is shown as comprised of upstanding elements 52 and 54, supporting transversely extending shaft 68 upon which the clamping elements 70, 71 and 72 are pivoted while being actuated by air cylinder 74, in turn, controlled by individual air valves 76 and 78. A circular saw 56 is pivoted upon a longitudinal axis at the cutting end of the table and is driven by motor 60 belt drive 58. The circular saw unit may be secured to end element 54 by means of bolt 62.

Figure 5:
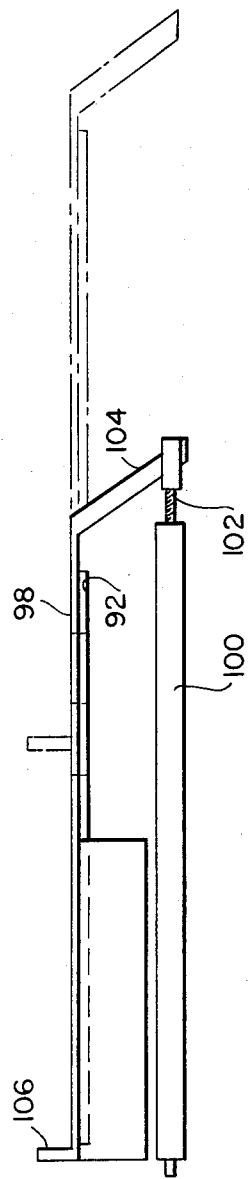
FIG. 5 is an enlarged elevation of the transverse ejector which is supported in the table top.
Figure 6:
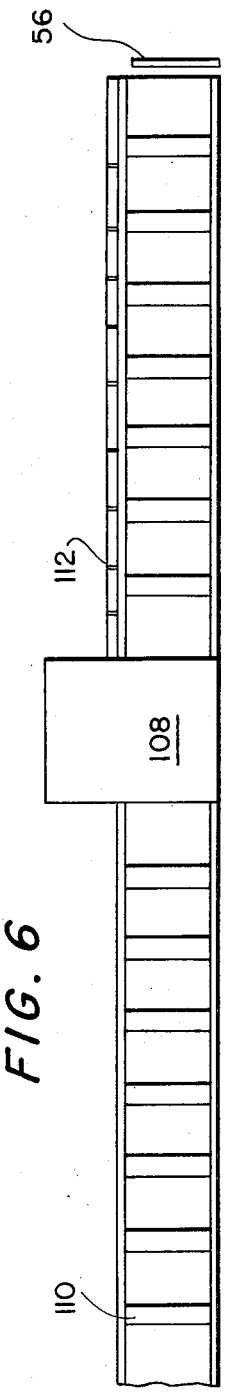
FIG. 6 is a top plan of an adjacent assembly for cutting and marking headers, crippers and sills.

The cutting and marking support table includes a horizontal surface 62 and an upwardly extending bulkhead of baffle 64 at right angles thereto. A movable stop 63 is supported upon the bulkhead 64 and engages chain 80 which runs beneath the template support area 65. A turn buckle assembly 66 may be employed to adjust the top. The chain drive 80 is actuatable by hand wheel 82 so as to move the stop longitudinally with respect to the surface 62. A plurality of transverse rollers 88 and 90 may be employed to assist in the positioning of plate stock on the horizontal surface. The plate stock, such as two by fours, are positioned so that their ends abut movable stop 64 vertically extending surface 61, while the inner side of the stock abuts the bulkhead 64. The stock is then clamped in place via pivoting of clamp elements 70, 71 and 72, circular saw 65 may be pivoted by actuation of handle 84, so as to traverse the support bed and cut the stock free ends. While the stock remains clamped, the stock may be marked corresponding to the template marking, then the stock may be ejected by actuation of the air cylinder 100 illustrated FIG. 5, so as to move the ejectors 98 and their upwardly extending studs 106 transversely across surface 62 ejecting the plate stock onto ties 114, 116, 118 and 120.

The ejectors 98 are movable in guide 92 and include an angularly downwardly extending leg 104 adjustable by set screw assembly means 102 with respect to air cylinder 100.

A suggested operating technique includes:

PLATE LAYOUT OR MARKING

All plates will be laid out on template strips. Only one template strip will be required. The left end of the template strip in every case should show:
1. the job and building number
2. wall number
3. wall length
4. header, sill and cripper lengths of all openings
5. packer lengths
6. length of cap plate
7. cap plate setback and overhang If the job is for a project or a house that is to be built more than once, it should be laid out so that the strip can be reversed and a left or a right unit built. This is done by turning the strip around and putting the same information on the other end.

Any other information that will be required to build the wall panel should also be included on the strip, as this will be the only place that information is transferred to the plates. There will be no cut sheets required with this system.

After the template strips have been laid out, place them in one of the racks over the plate cutting saw and label the rack with the job and building number.

PLATE CUTTING

The pre-laid out template strip will be stored in the overhead racks after they are laid out and whenever a building is scheduled to be built, take the whole set and place them on the top shelf above the saw table.

Select the first template strip and place it on template support 65 of the cutting table so that one end abuts stop 61. Read what length of plate is required from the strip and get from the stock pile the proper bottom plate, top plate, 1 × 4, and cap plate and place it on the table. Turn the plate-stop hand wheel 82 until the template strip is brought up tight against the stop 86 that is aligned with the saw blade 56. This will automatically flush the ends of the plates and 1 × 4 and put them in the proper position for cutting. Transfer all the marks from the template strip to the four pieces of lumber. Be sure to indicate on the plates all the information that is on the lay-out strip so that the wall can be properly built when it reaches the framing table. After the layout is finished, pull the saw 56 across the left end of the plates cutting all four at one time. Transfer them to the cross conveyor and take the header, sills and crippers that have been cut and place them either on top of the plates or in front of them so that they will be carried along with the plates when the cross conveyor moves.

Be sure to keep each set of parts for every wall separated so that when the headers are taken off the line, it will be known which wall they are intended for. The 1 × 4 will be laid out at its edge but it should also be turned flat and marked on it the job, building number, and wall number.

If the cap plate is to be cut a different length from the other plates, mark this length with your tape and position the cap plate so that it will be cut to the proper length when the other material is cut. The cap plate should always be placed against the backstop so it will be the last piece to be fed in at the framing table.

For special or unique work to be performed on a wall it should be "red flagged" with a 16 penny nail to be driven about one-half inch into the plate where the special work is to be performed. The special work to be done would be written on the plate at this point. An example of this would be stopping the blackboard at a certain place where the wall was to become an inside wall, or to provide a special block or other work not done in the usual fabrication of walls. For example, there are some windows that do not get blackboard on the headers.

Manifestly, the table configuration, as well as the method of clamping, ejecting and stopping the plate elements may be varied without departing from the spirit of invention.

I claim:

1. Apparatus for cutting and marking plate stock of the type used in building wall panels comprising:
    A. a longitudinally extending table defining:
        i. a plate cutting and marking support having:
            a. at least one roller element transversely supported in the top surface as an assistance in the in-line handling of plate stock,
            b. a horizontal bed for supporting plate stock,
            c. a vertical baffle at the front end of said bed and,
        ii. an adjacent template support;
    B. a saw positioned at the cutting end of said table;
    C. a movable stop positioned at the measuring end of said table so as to abut template and plate stock ends, while positioning said stock templates with respect to said saw;
    D. at least one plate stock engaging clamp pivoted transversely in said table, so as to clamp said stock within said cutting and marking support; and
    E. a plate ejector reciprocated transversely in the top of said cutting and marking support and extending transversely, so as to eject plate stock after cutting and marking;
    F. a saw mounted upon a longitudinal axis at the cutting end of said table and pivotable across plate stock positioned upon said plate cutting and marking support;
    G. a measuring scale positioned upon said vertical baffle and extending from the cutting end of said table to the plate cutting and marking end and engaging said movable stock, such that movement of said scale moves said stock with respect to said support.

2. Apparatus for cutting and marking plate stock of the type used in building wall panels as in claim 1, including a plurality of plate stock engaging clamps pivoted upon a longitudinal shaft supported in said table such that said clamps are pivotable from below into the side of plate stock positioned upon said bed.

3. Apparatus for cutting and marking plate stock of the type used in building wall panels as in claim 2, including a plurality of plate ejectors supported reciprocably within said bed and having an upwardly extending stud recessed within said vertical baffle, so as to grab the edge of said stock being cut and measured.

4. Apparatus for cutting and marking plate stock of the type used in building wall panels as in claim 3, including:
    H. an air cylinder supported upon said table and engaging the outer end of said ejector so as to reciprocate transversely said ejector through said bed.

5. Apparatus for cutting and marking plate stock of the type used in building wall panels as in claim 4, including:
    I. a plurality of ties extending transversely from said support to a cross conveyor mechanism and in parallel with said ejectors.

6. Apparatus for cutting and marking plate stock of the type used in building wall panels as in claim 1, including:
    J. a chain drive rotatably supported within said vertical baffle and engaging said movable stop, so as to enable longitudinal movement of said stop via a control positioned at the plate cutting end of the table.

* * * * *